Patented Aug. 19, 1947

2,425,730

UNITED STATES PATENT OFFICE 2,425,730

THYMOXY-ACETAMIDINES

Carl Djerassi, Chatham, and Caesar R. Scholz, Summit, N. J., assignors to Ciba Pharmaceutical Products, Incorporated, Summit, N. J., a corporation of New Jersey No Drawing. Application September 9, 1946, Serial No. 695,812

3 Claims. (Cl. 260—564)

The present invention relates to new and useful chemical compounds—certain N-substituted thymoxy-acetamidines—which are characterized more particularly by their outstanding therapeutic (anticholinergic and atropine-like) activity.

Some thymoxy-acetamidines have heretofore been prepared, among others thymoxy-acetamidine itself

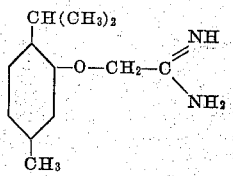

and the corresponding N-dibutyl thymoxy-acetamidine. These compounds are, however, characterized by no particularly noteworthy anticholinergic action and the expectation was that all the members of the homologous series would be essentially similar in character.

It has been found, however, that contrary to expectation those N-substituted thymoxy-acetamidines which correspond to the formula

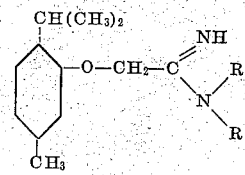

wherein both R's are either methyl or ethyl groups, are endowed with outstanding anticholinergic activity.

The following table shows the relative anticholinergic potencies of amidines of the structure

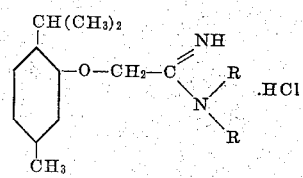

referring to R=$C_4H_9$=1 as a standard of comparison. As will be evident from the said table, the N-dimethyl thymoxy-acetamidine and the N-diethyl thymoxy-acetamidine are more than 100 times more potent as anticholinergic agents than the known thymoxy-acetamidine and are at least from 10 to 20 times more potent as anticholinergic agents than the known N-dibutyl thymoxy-acetamidine, in the form of their respective hydrochlorides. The activity of the N-dipropyl compound, while somewhat enhanced, is essentially of the order of that of the N-dibutyl compound. The N-dimethyl and N-diethyl compounds thus surprisingly form a special subgroup within the larger group of the thymoxy-acetamidines hereinbefore enumerated.

Table

| R | Anticholinergic Activity | |
|---|---|---|
| | Dose γ | Relative Potency |
| H | >10 | <0.1 |
| $CH_3$ | 0.05–0.1 (0.075) [1] | 13 |
| $C_2H_5$ | 0.05–0.1 (0.075) [1] | 13 |
| $C_3H_7$ | 0.5–1 (0.75) [1] | 1.3 |
| $C_4H_9$ | 1 | 1 |

[1] Average.

In addition, the N-dimethyl thymoxy-acetamidine and N-diethyl thymoxy-acetamidine also possess an atropine-like activity and are at least equally as potent in this respect as atropine.

The compounds of the present invention may be prepared in a number of ways, of which the following examples are illustrative.

Example 1

A suspension of 2.98 parts by weight of ethyl thymoxy-acetimidate hydrochloride (prepared by condensing thymol with chloroacetonitrile, and reacting the resulting thymoxyacetonitrile with hydrochloric acid in ethanolic solution), in 6.0 parts by volume of ethanolic dimethylamine (containing 0.636 part by weight of dimethylamine) is shaken for 72 hours in a closed vessel. The resultant amidine-hydrochloride is filtered and recrystallized from a mixture of methylethylketone and ethanol. N-dimethyl thymoxy-acetamidine hydrochloride is obtained as colorless, long needles melting at 197°–198° C.

Example 2

The reaction mixture containing the amidine-hydrochloride, as prepared according to Example 1, is poured into 10% potassium carbonate solution, the free amidine extracted with chloroform, the extract washed until neutral and the chloroform evaporated. The resulting amidine is kept under vacuum for a short time to remove traces of dimethylamine. If desired, the thus-isolated free base may then be converted to the hydrochloride salt with an alcoholic hydrogen chloride solution followed by dilution with ether. The product obtained is identical with that obtained by the more direct procedure described in Example 1.

*Example 3*

A solution of 10.84 parts by weight of ethyl thymoxy-acetimidate hydrochloride in ethanolic diethylamine (containing 3.14 parts by weight of diethylamine) is allowed to stand in a closed vessel for 48 hours. The clear solution is concentrated to a small volume, poured into aqueous sodium carbonate solution and the amidine extracted with chloroform. After washing, drying, and evaporating the solvent, the amidine is kept under reduced pressure for a short time (15 minutes) to remove traces of diethylamine. On addition of a methanolic hydrogen chloride solution, and precipitation with petroleum-ether, colorless crystals of N-diethyl thymoxy-acetamidine hydrochloride melting at 212–212.5° C. are obtained.

In the foregoing illustrative examples, parts by weight bear the same relation to parts by volume as do grams to cubic centimeters.

The new compounds of the present invention may be administered orally, for example, in tablet form, or topically or parenterally in aqueous solution.

While, insofar as salts are concerned, reference has hereinbefore been made by way of illustration to the hydrochloride, it is to be understood that other salts such as the hydrobromide and the like may also be prepared in analogous manner. The aforementioned therapeutic activity inures to the free base as well as to its several mineral acid salts.

Having thus disclosed the invention, what is claimed is:

1. A compound selected from the group consisting of N-dimethyl thymoxy-acetamidine, N-diethyl thymoxy-acetamidine, and salts thereof.
2. N-dimethyl thymoxy-acetamidine hydrochloride.
3. N-diethyl thymoxy-acetamidine hydrochloride.

CARL DJERASSI.
CAESAR R. SCHOLZ.